(12) United States Patent
Smith

(10) Patent No.: US 7,757,487 B2
(45) Date of Patent: Jul. 20, 2010

(54) DRIVE APPARATUS

(75) Inventor: Norman John Smith, Kurwongbah (AU)

(73) Assignee: Titan Research and Innovations Pty Ltd., Glen Waverley, Victoria (AU)

( * ) Notice: Subject to any disclaimer, the term of this patent is extended or adjusted under 35 U.S.C. 154(b) by 226 days.

(21) Appl. No.: 11/795,954

(22) PCT Filed: Jan. 30, 2006

(86) PCT No.: PCT/AU2006/000106

§ 371 (c)(1),
(2), (4) Date: Jul. 25, 2007

(87) PCT Pub. No.: WO2006/079179

PCT Pub. Date: Aug. 3, 2006

(65) Prior Publication Data

US 2008/0141670 A1 Jun. 19, 2008

(30) Foreign Application Priority Data

Jan. 28, 2005 (AU) ............................. 2005900357
Nov. 24, 2005 (AU) ............................. 2005906540

(51) Int. Cl.
*B60K 7/00* (2006.01)
*F16H 39/02* (2006.01)
*B60K 28/16* (2006.01)

(52) U.S. Cl. .......................................... 60/484; 60/486
(58) Field of Classification Search ................... 60/484, 60/486
See application file for complete search history.

(56) References Cited

U.S. PATENT DOCUMENTS 3,188,996 A * 6/1965 Thompson .................... 60/421

(Continued)

FOREIGN PATENT DOCUMENTS

DE 42 24 075 A1 2/1994

(Continued)

*Primary Examiner*—Thomas E Lazo
(74) *Attorney, Agent, or Firm*—Hoffman, Wasson & Gitler, P.C.

(57) ABSTRACT

A drive apparatus for a vehicle, the apparatus comprising a hydraulic pump, two control valve assemblies, and two pairs of hydraulic drive assemblies. The control valve assemblies are hydraulically connected in parallel, and in an operational condition hydraulic fluid is pumped through the control valve assemblies by the pump to drive the hydraulic drive assemblies, and wherein each control valve assembly proportionately distributes hydraulic fluid to a respective pair of the hydraulic drive assemblies in response to the hydraulic loads of the respective hydraulic drive assemblies of the respective pairs of hydraulic drive assemblies. In response to a difference in the respective hydraulic loads of the hydraulic drive assemblies of the respective pairs of hydraulic drive assemblies, flow of hydraulic fluid to the hydraulic drive assembly of each of the respective pairs of hydraulic drive assemblies having the lower hydraulic load is limited, and wherein each of the hydraulic drive assemblies includes a ground engaging drive member and at least one hydraulic motor for driving the drive member.

15 Claims, 2 Drawing Sheets

U.S. PATENT DOCUMENTS

Figure 1:
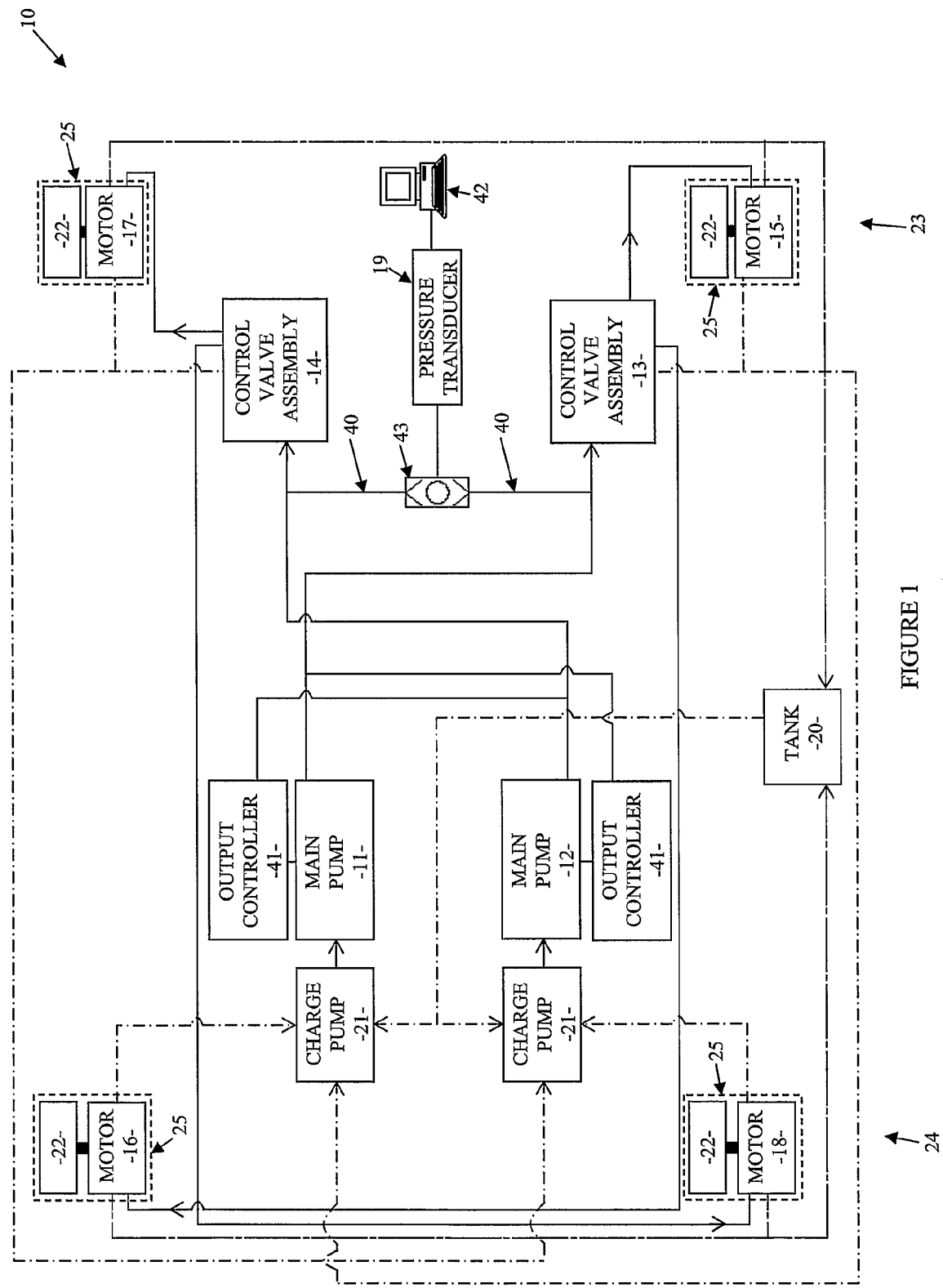

| | | | |
|---|---|---|---|
| 3,641,765 A | * | 2/1972 | Hancock et al. ............... 60/484 |
| 3,952,511 A | | 4/1976 | Turner et al. |
| 4,202,453 A | * | 5/1980 | Wilkes et al. ............... 180/235 |
| 5,848,664 A | | 12/1998 | Kaspar |
| 5,924,509 A | | 7/1999 | Ferguson et al. |
| 5,931,078 A | | 8/1999 | Kropp |
| 6,073,716 A | | 6/2000 | Ellertson et al. |
| 6,321,866 B1 | | 11/2001 | Prohaska |
| 2004/0216456 A1 | | 11/2004 | Cousin et al. |

FOREIGN PATENT DOCUMENTS

| | | |
|---|---|---|
| DE | 102 55 643 B3 | 4/2004 |
| EP | 1 079 153 A2 | 2/2001 |
| GB | 2 351 715 A | 1/2001 |
| WO | WO 01/51304 A1 | 7/2001 |

* cited by examiner

DRIVE APPARATUS

FIELD OF THE INVENTION

The present invention relates generally to hydraulic drive apparatus and, in particular, to hydraulic drive apparatus which are used to propel vehicles.

Although the invention will be described with particular reference to hydraulic drive apparatus which include four ground engaging drive members such as wheels or tracks, it will be appreciated that this is by way of example only and that the invention may be used in relation to hydraulic drive apparatus which have more than four ground engaging drive members and which may have ground engaging drive members other than wheels or tracks.

BRIEF DISCUSSION OF THE PRIOR ART

A typical prior art hydraulic drive apparatus for a vehicle such as an articulated earthmoving machine or tractor includes a hydraulic pump, a first pair of hydraulic drive assemblies mounted relative to a front section of the articulated vehicle, and a second pair of hydraulic drive assemblies mounted relative to a rear section of the vehicle which is articulated with respect to the front section. Each drive assembly includes a respective ground engaging drive member, such as a wheel or a track, and a respective hydraulic motor which drives the ground engaging drive member. Hydraulic fluid is pumped through each of the hydraulic motors by the pump of the drive apparatus so that the hydraulic motors drive the ground engaging members which thereby propel the vehicle along the ground.

A problem with the prior art hydraulic drive apparatus as just described is that if a ground engaging drive member breaks traction with the ground for some reason, the hydraulic load presented to the hydraulic pump by the motor driving the drive member which has lost traction will decrease so that there is less hydraulic resistance to the flow of hydraulic fluid through that motor. This reduction in resistance results in more hydraulic fluid flowing through the motor whose drive member has lost traction, and less hydraulic fluid flowing through the other motors whose drive members have not lost traction and are driven by that pump. Increasing the flow of hydraulic fluid through the motor whose drive member has lost traction causes that motor to operate at a higher speed, while at the same time causes the other motors whose drive members have not lost traction to operate at a lower speed. The net effect is that the speed of the vehicle is reduced since there is a reduction in the speed of the motors whose ground engaging drive members have not broken traction with the ground.

If a drive member completely loses traction, basically all of the hydraulic fluid circulating through the drive apparatus flows through the motor driving that drive member so that the other motors are starved of hydraulic fluid which causes the vehicle to come to a halt.

It has been found that even if hydraulic flow proportioning valves are fitted to the drive apparatus between the hydraulic pump and the hydraulic motors, the ground engaging members are still able to break traction and spin or circulate freely (in the case of the ground engaging members being wheels or tracks) with most if not all of the hydraulic fluid flowing through the valves going to the freely spinning or circulating ground engaging member.

In agricultural applications where a vehicle having a conventional differential drive apparatus including a plurality of ground engaging drive members employs a drawbar to pull a trailing implement, or where the vehicle is working on uneven or steep terrain, losing traction on a full turn is a real problem. This is because on full turn it is the drive members on the outside of the turn radius which are doing the majority of the pulling because braking is usually applied to the drive members on the inside of the turn radius to assist the turn. If a drive member on the outside of the turn radius breaks traction, this inhibits the ability of the vehicle to complete the turn. Conventionally, if a drive member breaks traction, it is necessary to reduce the load on the vehicle to eliminate the lost traction so that the turn can be completed.

Various types of traction control systems for hydraulic drives have been developed in an attempt to overcome the aforementioned problems. U.S. Pat. Nos. 5,848,664 (Kaspar), 6,321,866 (Prohaska), 5,924,509 (Ferguson et al.), 5,931,078 (Kropp), and 6,073,716 (Ellertson et al.) disclose examples of hydraulic drives which employ traction control systems.

The hydraulic drives disclosed by the Kaspar, Prohaska and Ferguson patents all employ electronic traction control. Hydraulic drives which employ electronic traction control are generally complicated and are prone to experiencing reliability problems. Also, the fragile electronics of such hydraulic drives are not particularly suited to the harsh working environments in which hydraulic drives are typically employed. As will be appreciated, failure of an electronic traction control system can compromise the vehicle's ability to operate to maximum capacity or in fact be able to operate at all.

Kropp discloses a hydraulic drive circuit which relies on valves to control the hydraulic pressures in different parts of the circuit. In particular, the hydraulic drive circuit employs pressure reducing valves to provide the hydraulic drive with traction control. A problem with the hydraulic drive disclosed by Kropp is that it can generate a residual heat load.

The hydraulic drive disclosed by Ellertson et al. uses wheel traction to regulate variations in ground speed. The drive relies upon the operation of hydraulic "fuses" in the hydraulic circuit of the drive to cause the flow and pressure of hydraulic fluid in the hydraulic circuit of the drive to be distributed to hydraulic motors whose associated wheels have not lost traction so that the hydraulic drive is thereby able to maintain traction.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying illustrations, wherein, by way of illustration and example, a preferred embodiment of the present invention is disclosed.

According to a broad aspect of the present invention there is provided a drive apparatus for a vehicle, the drive apparatus comprising a hydraulic pump, two control valve assemblies, and two pairs of hydraulic drive assemblies, wherein the control valve assemblies are hydraulically connected in parallel, and in an operational condition hydraulic fluid is pumped through the control valve assemblies by the pump to drive the hydraulic drive assemblies, and wherein each control valve assembly proportionately distributes hydraulic fluid to a respective pair of the hydraulic drive assemblies in response to the hydraulic loads of the respective hydraulic drive assemblies of the respective pairs of hydraulic drive assemblies, and wherein in response to a difference in the respective hydraulic loads of the hydraulic drive assemblies of the respective pairs of hydraulic drive assemblies, flow of hydraulic fluid to the hydraulic drive assembly of each of the respective pairs of hydraulic drive assemblies having the lower hydraulic load is limited, and wherein each of the hydraulic drive assemblies includes a ground engaging drive member and at least one hydraulic motor for driving the drive member.

The drive apparatus is analogous in its operation to a mechanical drive apparatus of a four-wheel drive vehicle which has open mechanical differentials so that each of the wheels of the vehicle is able to rotate at a different speed to the other wheels without slipping or dragging along the ground when the vehicle turns.

The drive apparatus limits the flow of hydraulic fluid through the hydraulic motor of a hydraulic drive assembly whose ground engaging drive member has lost traction so that the rate at which that drive member is driven by the motor does not increase uncontrollably at the expense of the other drive members of the drive apparatus which have not lost traction. This enables the vehicle on which the drive apparatus is installed to turn in a controlled manner at a constant speed even while the vehicle is pulling or otherwise moving a large load.

The simplicity of the drive apparatus according to the present invention provides the drive apparatus with a significant advantage over many prior art hydraulic drives which have traction control. Unlike many prior art hydraulic drives, the drive apparatus according to the present invention does not rely upon complicated and fragile electronics to control the traction problems associated with conventional hydraulic drives. This means that the drive apparatus according to the present invention is generally more rugged than prior art hydraulic drives which employ electronic traction control and is therefore better able to cope with the harsh environments in which hydraulic drives are often used.

The respective pairs of hydraulic drive assemblies can be configured in any way. For example, a first pair and a second pair of the respective pairs of drive assemblies could respectively be located on the left and right sides of the vehicle. However, where the first pair and the second pair of drive assemblies are respectively located on the left and right sides of the vehicle, there will be a difference in the load between the control valve assemblies when the vehicle is turned or if traction is lost on one side of the vehicle.

If the first pair and the second pair of drive assemblies are respectively located at the front and rear of the vehicle, there will be a difference in the load between the control valve assemblies if traction is lost by the pair of ground engaging drive members at the front or rear of the vehicle.

It is preferred that the drive assemblies of the first pair of drive assemblies and the second pair of drive assemblies are located diagonally opposite to each other because the load of each control valve assembly will remain substantially constant even when the vehicle turns or when the ground engaging drive members on the left, right, front, or back of the vehicle lose traction. Although there will be a difference in the load of the control valve assemblies if diagonally opposed drive members lose traction, the situation where diagonally opposed drive members lose traction is less likely to occur in comparison to both of the drive members on the left, right, front, or rear of the vehicle losing traction. It is desirable to minimise differences in load between the control valve assemblies to ensure that there is no buildup of temperature in one of the control valve assemblies.

The drive apparatus may be incorporated into any suitable vehicle. For example, the drive apparatus may be incorporated into an earthmoving, mining, or agricultural machine such as a tractor or the like. In a preferred form of the present invention, the drive apparatus is incorporated into an articulated vehicle. However, the drive apparatus may be incorporated into a vehicle which is not articulated.

The hydraulic pump of the drive apparatus may be any suitable hydraulic pump. In a preferred form, the pump is a variable displacement hydraulic piston pump which is adapted to output a constant flow of hydraulic fluid at variable pressure. Other types of hydraulic pump may alternatively be used. For example, the pump may be a hydraulic vane pump.

The drive apparatus may comprise a single hydraulic pump or two or more hydraulic pumps. If the drive apparatus comprises two or more hydraulic pumps it is preferred that the pumps operate at substantially similar pressures and flow rates.

According to a preferred form of the present invention, the drive apparatus includes a first hydraulic pump and a second hydraulic pump which are connected in parallel. The first pump is connected to a first control valve assembly so that hydraulic fluid is able to be pumped through the first control valve assembly by the first pump. The second pump is connected to a second control valve assembly so that hydraulic fluid is able to be pumped through the second control valve assembly by the second pump. Moreover, the first pump is connected to the second control valve assembly, and the second pump is connected to the first control valve assembly so that hydraulic fluid is able to be pumped through the second control valve assembly by the first pump, and so that hydraulic fluid is able to be pumped through the first control valve assembly by the second pump. Hydraulic fluid exhausted from the first control valve assembly is preferably returned to the first pump, and hydraulic fluid exhausted from the second control valve assembly is preferably returned to the second pump.

When two hydraulic pumps are used, the pumps typically output a predetermined volume and it is desirable to have a hydraulic balance line between the outputs of the respective pumps in order to provide even pressure to the control valve assemblies. The hydraulic balance line allows hydraulic fluid to be distributed to the respective control valve assemblies proportionately, depending on the load of the control valve assemblies.

When two hydraulic pumps are used, it is particularly preferable that the drive assemblies of the first pair of drive assemblies and the second pair of drive assemblies are located diagonally opposite to each other as this reduces the volume of hydraulic fluid flowing through the hydraulic balance line and hence reduces the likelihood of a build-up in temperature in the balance line.

Each pump is preferably connected to a respective charge pump. In a preferred embodiment, the charge pump draws low pressure hydraulic fluid from a hydraulic fluid storage tank and outputs the hydraulic fluid to the main pump which then pumps the hydraulic fluid through a control valve assembly.

Each pump preferably has an output controller. The output controllers are preferably linked in parallel so that both of the pumps have substantially identical outputs of hydraulic fluid.

Each control valve assembly may be of any suitable type. Preferably, the control valve assemblies are substantially identical. Also, it is preferred that each control valve assembly includes a plurality of hydraulic valves.

Preferably, the control valve assemblies are hydraulically or mechanically-controlled. It has been found that hydraulically and mechanically-controlled control valve assemblies are less susceptible to failure compared to electronically-controlled control valve assemblies.

Each of the control valve assemblies preferably includes a plurality of proportional displacement flow control valves. Preferably, the proportional displacement flow control valves are connected to the pumps which pump the hydraulic fluid to the control valve assemblies, and at least one respective proportional displacement flow control valve is connected to each one of the hydraulic drive assemblies.

Each of the control valve assemblies preferably also includes a plurality of anti-cavitation pressure relief valves. Preferably, the anti-cavitation pressure relief valves are connected to the pumps which pump the hydraulic fluid to the control valves assemblies, and at least one respective anti-cavitation pressure relief valve is connected to each of the proportional displacement flow control valves.

In a particular preferred form, each of the control valve assemblies is similar to the MH4 control valve assembly manufactured by Bosch Rexroth AG in that each control valve assembly includes a proportional displacement flow control valve sub-assembly which comprises four hydraulically-controlled proportional displacement flow control valves, and four anti-cavitation pressure relief valves. The inlets of the proportional displacement flow control valves are preferably connected to the outlet of one of the pumps. The outlets of a first pair of the proportional displacement flow control valves are preferably connected to an inlet of one of the hydraulic motors, and the outlets of a second pair of the proportional displacement flow control valves are preferably connected to an inlet of another one of the hydraulic motors. The outlets of the first pair of proportional displacement flow control valves are preferably also connected to the inlets of first pair of the anti-cavitation pressure relief valves, and the outlets of the second pair of proportional displacement flow control valves are preferably also connected to the inlets of a second pair of the anti-cavitation pressure relief valves. The outlets of the anti-cavitation pressure relief valves are preferably connected to an inlet of a charge pump which pumps hydraulic fluid to the pump which is connected to the inlets of the proportional displacement flow control valves so that hydraulic fluid which is exhausted from the control valve assembly is returned to the aforementioned charge pump.

Each of the anti-cavitation pressure relief valves preferably includes a check valve which is able to prevent hydraulic fluid from flowing from the proportional displacement flow control valve sub-assembly to the charge pump through the anti-cavitation pressure relief valve. In addition, each anti-cavitation pressure relief valve preferably has a bypass channel which, in contrast to the check valve, is able to permit hydraulic fluid to flow from the proportional displacement flow control valve sub-assembly to the charge pump through the anti-cavitation pressure relief valve. The inlet and outlet of each valve may be alternately connected to each other by the check valve and the bypass channel of the pressure relief valve. Each anti-cavitation pressure relief valve preferably has a coil spring which biases the check valve and the bypass channel of the pressure relief valve so that the inlet and outlet of the pressure relief valve are connected together by the check valve. Preferably, each pressure relief valve also includes a pilot line which is connected to the outlets of either the first pair or the second pair of the proportional displacement flow control valves. If the pressure of hydraulic fluid in the pilot line of a pressure relief valve exceeds a predetermined amount which overcomes the force exerted by the spring of the pressure relief valve on the check valve and the bypass channel of the valve, the inlet and outlet of the valve are connected together by the bypass channel rather than the check valve so that hydraulic fluid may be vented through the pressure relief valve to the pump which pumped the fluid through the control valve assembly.

Each hydraulic drive assembly may be of any suitable type. In a preferred embodiment, the hydraulic drive assemblies are substantially identical. However, in other embodiments, the hydraulic drive assemblies may all be different, or may include a mixture of identical and different drive assemblies.

The motor of each hydraulic drive assembly may be of any suitable type. In a preferred form, the motor is a hydraulic piston motor. In another preferred form, the motor is a hydraulic vane motor. Preferably, the motor is located in the drive assembly. For example, if the drive member which is driven by the motor is a wheel, the motor may be located at the hub of the wheel.

The ground engaging drive member of each hydraulic drive assembly may be of any suitable type. For example, the drive member may be a wheel or a track amongst other types of drive members.

Two of the hydraulic drive assemblies are preferably located in front of the other two hydraulic drive assemblies. If the vehicle on which the drive apparatus is incorporated is an articulated vehicle having a front section and a rear section which is articulated with respect to the front section, it is preferred that two of the drive assemblies are mounted relative to the front section, while the other two drive assemblies are mounted relative to the rear section. Preferably, the drive assemblies mounted relative to the front section are located adjacent opposite sides of the front section, such as the right-hand and left-hand sides of the front section. Preferably, the drive assemblies mounted relative to the rear section are located adjacent opposite sides of the rear section, such as the right-hand and left-hand sides of the rear section. It is also preferred that the first pair and the second pair of hydraulic drive assemblies each include a drive assembly which is located both in front of and diagonally opposite from the other drive assembly of the pair.

The first control valve assembly is preferably connected to the motor of each drive assembly of the first pair of drive assemblies by a respective hydraulic pilot line so that the first control valve assembly is able to sense differences in the rates of flow of hydraulic fluid to the drive assemblies of the first pair of drive assemblies. The second control valve assembly is preferably connected to the motor of each drive assembly of the second pair of drive assemblies by a respective hydraulic pilot line so that the second control valve assembly is able to sense differences in the rates of flow of hydraulic fluid to the drive assemblies of the second pair of drive assemblies.

Preferably, each drive assembly includes a sensor for sensing the load of each drive assembly on the control valve assembly which they are connected to so that the control valve assembly is able to determine whether there is a difference between the sensed loads. The sensors may, for example, be hydraulic or mechanical sensors.

Preferably, the drive apparatus also comprises a tank for collecting exhaust hydraulic fluid from the motor of each hydraulic drive assembly and, in particular, the motor case drains of the hydraulic assembly. Preferably, hydraulic fluid from the tank is pumped through the hydraulic valve assemblies by the hydraulic pumps.

The apparatus preferably includes a hydraulic fluid pressure transducer for measuring the pressure of the hydraulic fluid which is output to the control valve assemblies for diagnostic purposes. The output of the transducer may be connected to a device such as a computer which enables the signal which is output by the transducer to be viewed or recorded.

The apparatus also preferably includes a pressure shuttle valve. The shuttle valve is preferably located under the hydraulic fluid pressure transducer and is preferably connected between the outputs of the first and second pumps of the apparatus so that the shuttle valve is able to sense pressure differentials between the outputs of the two pumps.

BRIEF DESCRIPTION OF THE ILLUSTRATIONS

Figure 2:
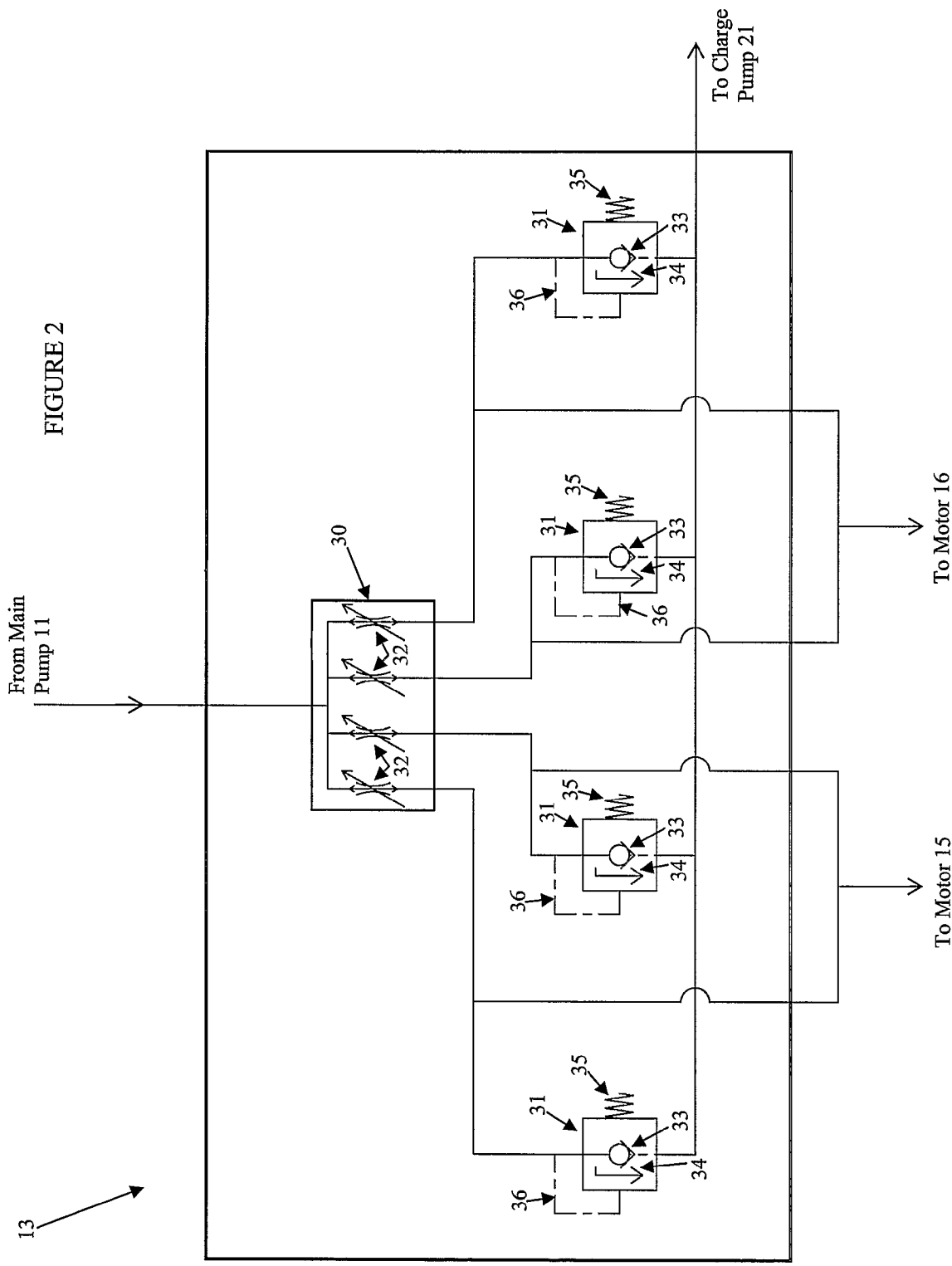

In order that the invention may be more fully understood and put into practice, a preferred embodiment thereof will now be described with reference to the accompanying illustrations in which:

FIG. 1 is a schematic hydraulic circuit diagram of a hydraulic drive apparatus according to the preferred embodiment of the present invention; and FIG. 2 is a schematic hydraulic circuit diagram of a control valve assembly of the hydraulic drive apparatus depicted in FIG. 1.

DETAILED DESCRIPTION OF THE ILLUSTRATIONS

A drive apparatus 10 according to a preferred embodiment of the present invention is depicted in FIG. 1. Drive apparatus 10 is incorporated into an articulated vehicle (not shown) and is operable to drive or propel the vehicle along the ground.

Apparatus 10 comprises a first hydraulic main pump 11, a second hydraulic main pump 12, a first hydraulically-controlled hydraulic control valve assembly 13, a second hydraulically-controlled hydraulic control valve assembly 14, hydraulic motors 15, 16, 17, 18, a hydraulic fluid pressure transducer 19, and a hydraulic fluid storage tank 20.

Hydraulic pumps 11, 12 are identical parallel variable displacement hydraulic piston pumps which are adapted to output a variable flow of hydraulic fluid as required at variable pressure. An inlet of each pump 11, 12 is connected to an outlet of a respective hydraulic charge pump 21.

The hydraulic control valve assemblies 13, 14 are identical to each other, and each assembly 13, 14 includes a plurality of hydraulic valves. The hydraulic valves in each control valve assembly 13, 14 include load sensing proportional displacement flow control valves and anti-cavitation pressure relief valves.

Each of the hydraulic motors 15, 16, 17, 18 is a hydraulic piston motor. Each motor 15, 16, 17, 18 drives a respective ground engaging drive member 22 such as a wheel or track of the articulated vehicle which the drive apparatus 10 is incorporated into. Motor 15 and motor 17 each drive a respective ground engaging drive member 22 which is secured to a front section 23 of the articulated vehicle. Motor 15 drives a ground engaging drive member 22 which is located adjacent to the right-hand side of the vehicle, while motor 17 drives a ground engaging drive member 22 which is located adjacent to the left-hand side of the vehicle. Motors 16, 18 each drive a respective ground engaging drive member 22 of a rear section 24 of the vehicle which is articulated with respect to the front section 23. Motor 16 drives a ground engaging drive member 22 which is located adjacent to the left-hand side of the vehicle, while motor 18 drives a ground engaging drive member 22 which is located adjacent to the right-hand side of the vehicle. Each motor 15, 16, 17, 18 in combination with the ground engaging drive member 22 which is driven by the motor is referred to herein as a hydraulic drive assembly 25.

An inlet of the charge pump 21 which is connected to the first main pump 11, and an inlet of the charge pump 21 which is connected to the second main pump 12 are both connected to an outlet of the tank 20 so that each charge pump 21 is able to draw low pressure hydraulic fluid which is stored in the tank 20 through the outlet of the tank 20. The charge pumps 21 then deliver the hydraulic fluid which they have drawn from the tank 20 to the main pumps 11, 12.

An outlet of the main pump 11 is connected to an inlet of the first control valve assembly 13 so that the main pump 11 is able to pump high pressure hydraulic fluid through the assembly 13. An exhaust outlet of the first control valve assembly 13 is connected to an inlet of the charge pump 21 which is connected to the main pump 11 so that low pressure hydraulic fluid which is exhausted from the assembly 13 is able to be pumped back to the main pump 11 by the charge pump 21 which is connected thereto.

An inlet of motor 15 and an inlet of motor 16 are each connected to a respective outlet of the control valve assembly 13 so that high pressure hydraulic fluid which is pumped through the assembly 13 by the main pump 11 is able to be distributed to the motors 15, 16 by the assembly 13. The high pressure hydraulic fluid which is distributed to the motors 15, 16 passes through the motors 15, 16 to thereby drive the motors 15, 16. The majority of the high pressure hydraulic fluid which passes through the motors 15, 16 is exhausted therefrom through exhaust outlets and is returned to the charge pump 21 which is connected to the main pump 11. The charge pump 21 which is connected to the main pump 11 then reintroduces the exhausted hydraulic fluid to the main pump 11. Low pressure hydraulic fluid which is exhausted from the case drains of the motors 15, 16 collects in the tank 20 to await reuse.

Main pump 11 is able to pump hydraulic fluid through the control valve assembly 13 to drive the hydraulic drive assemblies 25 which are connected to the control valve assembly 13 and which include the motors 15, 16 and the ground engaging drive members 22 which are driven by the motors 15, 16.

Control valve assembly 13 senses the respective hydraulic loads of the hydraulic drive assemblies 25 which are connected to the control valve assembly 13 and distributes high pressure hydraulic fluid to those drive assemblies 25 in proportion to the hydraulic loads thereof.

FIG. 2 provides further detail of the control valve assembly 13 which is similar to the MH4 valve assembly which is manufactured by Bosch Rexroth AG. As mentioned previously, control valve assemblies 13 and 14 are identical to each other. Control valve assembly 13 includes a proportional displacement flow control valve sub-assembly 30 and a plurality of anti-cavitation pressure relief valves 31. The proportional displacement flow control valve sub-assembly 30 includes four hydraulically-controlled proportional displacement flow control valves 32. The inlets of the proportional displacement flow control valves 32 are connected to the outlet of the main pump 11. The outlets of a first pair of the valves 32 are connected to an inlet of the hydraulic motor 15, and the outlets of a second pair of the valves 32 are connected to an inlet of the hydraulic motor 16. The outlets of the first pair of valves 32 are also connected to the inlets of a first pair of the anti-cavitation pressure relief valves 31, and the outlets of the second pair of valves 32 are also connected to the inlets of a second pair of the anti-cavitation pressure relief valves 31. The outlets of the anti-cavitation pressure relief valves 31 are connected to an inlet of the charge pump 21 which pumps hydraulic fluid to the main pump 11 so that hydraulic fluid which is exhausted from the control valve assembly 13 is returned to the aforementioned charge pump 21.

Each anti-cavitation pressure relief valve 31 includes a reverse flow check valve 33 which is able to prevent hydraulic fluid from flowing from the proportional displacement flow control valve sub-assembly 30 to the charge pump 21 through the anti-cavitation pressure relief valve 31. In addition, each anti-cavitation pressure relief valve 31 has a bypass channel 34 which, in contrast to the check valve 33, is able to permit hydraulic fluid to flow from the proportional displacement flow control valve sub-assembly 30 to the charge pump 21 through the anti-cavitation pressure relief valve 31. The inlet and outlet of each valve 31 are able to be alternately connected to each other by the check valve 33 and the bypass channel 34 of the pressure relief valve 31. Each valve 31 includes a coil spring 35 which biases the check valve 33 and the bypass channel 34 of the pressure relief valve 31 so that the inlet and outlet of the pressure relief valve 31 are connected together by the check valve 33. Each pressure relief valve 31 also includes a pilot line 36 which is connected to the outlets of either the first pair or the second pair of the proportional displacement flow control valves 32. If the pressure of hydraulic fluid in the pilot line 36 of a pressure relief valve 31 exceeds a predetermined amount which overcomes the force exerted by the spring 35 of the valve 31 on the check valve 33 and the bypass channel 34 of the valve 31, the inlet and outlet of the valve 31 are connected together by the bypass channel 34 rather than the check valve 33 so that hydraulic fluid is able to be vented through the valve 31 to the charge pump 21.

The rate of flow of hydraulic fluid through the first pair and the second pair of proportional displacement flow control valves 32 is sensed by those valves. The flow of hydraulic fluid through the first pair and the second pair of the proportional displacement flow control valves 32 is proportionally distributed to the motors 15, 16 of the hydraulic drive assemblies 25 which are connected to the control valve assembly 13 so as to thereby regulate the speed of the motors 15, 16 and, consequently, the ground speed of the vehicle.

Each proportional displacement flow control valve 32 includes a valve body. Hydraulic fluid which is pumped to the control valve assembly 13 enters each valve body and a sleeved chamber which is located therein. A spool is located in the sleeve member, and the sleeve member includes measuring orifices for a selected dividing and summating ratio which the sleeve and spool are designed for. The measuring orifices compare the upstream and downstream flows of the hydraulic fluid. Incoming hydraulic fluid causes the spool to move against a preloaded compression spring within the spool assembly which the spool is part of. As the flow rates change, the cross-section of the measuring orifice changes as the spool moves. Seal rings are fitted to the spool for automatic switching from dividing to summating. As steering cylinders of the vehicle are activated to turn the vehicle, hydraulic fluid in the hydraulic lines which connect the motors 15, 16 to the control valve assembly 13 moves the spool by the correct ratio (summating) and the valve/spool redistributes the flow of hydraulic fluid to the motors 15, 16. As the control spools only start to control above a certain differential pressure (which in the present case is an 18% differential as determined by preload springs of the control valve assembly 13), the speed of the motor 15, 16 whose drive member 22 has lost traction is limited to the orifice ratio of the orifices in the sleeve. As the amount by which the vehicle is turned increases, the orifice ratio decreases so that on full turn overspeeding of the drive member 22 which has lost traction is prevented which enables the vehicle to make full power turns.

When the proportional displacement flow control valve spools are centrally located within the bore of the spool body which they are located in, the vehicle will travel in a straight line. As the vehicle is turned, the proportional flow control valves 32 sense an instantaneous shift in flow of hydraulic fluid between the drive member 22 located on the inside of the turn and the drive member 22 which is located on the outside of the turn, and adjust the distribution of the flow of hydraulic fluid in response to this. The trigger for the flow control valves 32 to adjust the flow is via the pressure relief valves 31. The motor 22 which is driving the inside drive member 22 wants to slow down. This causes a rise in pressure against the pressure relief valve 31 and the reverse flow check valve 33 which the hydraulic fluid to that motor 22 flows through, which in turn causes the flow control valve 32 connected to that motor 22 to sense and adjust the flow between the diagonally opposite motors 22 which are connected to the flow control valve 32.

The control valve assemblies 13, 14 enable the synchronism of multiple hydraulic motors 22 by distributing hydraulic fluid flow according to the flow differentials between the individual motors 22. The flow differentials of the individual motors is restricted to a pre-set maximum level to eliminate over speeding of the hydraulic motors 22, whilst accommodating the flow differentials required when steering the vehicle. The pressure relief valves 31 limit the pressure delivered to the independent wheel motors to a maximum permissible level.

The proportionate distribution of hydraulic fluid by the control valve assembly 13 is done in response to the respective hydraulic loads of the hydraulic drive assemblies 25 connected to the control valve assembly 13 so that if the hydraulic loads of those hydraulic drive assemblies 25 are the same, the control valve assembly 13 will evenly distribute hydraulic fluid between both of the hydraulic drive assemblies 25 which are connected to the control valve assembly 13. If there is a difference in the respective hydraulic loads of the hydraulic drive assemblies 25 connected to the control valve assembly 13, and that difference exceeds a predetermined value, the control valve assembly 13 responds by limiting the flow of hydraulic fluid to the hydraulic drive assembly 25 connected to the control valve assembly 13 which has the lower hydraulic load. The load of a hydraulic drive assembly 25 connected to the control valve assembly 13 decreases if the hydraulic resistance presented by that hydraulic drive assembly 25 to the flow of hydraulic fluid from the pump 11 decreases.

The control valve assembly 13 limits the flow of hydraulic fluid to the hydraulic drive assembly 25 which is connected thereto and which has the lower load by only allowing the flow of hydraulic fluid through the hydraulic drive assembly 25 in question to increase by up to a predetermined percentage if the lower load is present for at least a predetermined percentage of a single cycle of the hydraulic drive assembly 25. For example, the control valve assembly 13 may be configured to limit the flow of hydraulic fluid to the hydraulic drive assembly 25 which has the lower load by only increasing the flow of hydraulic fluid to the drive assembly 25 by up to 18% if the lower load condition is present for at least 18% of a cycle of the drive assembly 25. A single cycle of the drive assembly 25 may, for example, be defined as a single cycle of the motor of the drive assembly 25.

A lower load on a hydraulic drive assembly 25 which is connected to the control valve assembly 13 of the drive apparatus 10 corresponds to the drive member 22 of that hydraulic drive assembly 25 losing traction. By limiting the flow of hydraulic fluid to the hydraulic drive assembly 25 whose drive member 22 is experiencing a loss of traction, the control valve assembly 13 is able to prevent the speed at which the drive member 22 is driven from increasing by an excessive amount at the expense of the other hydraulic drive assembly 25 which is connected to the control valve assembly 13 and whose drive member 22 may not have lost traction.

The second hydraulic pump 12, second control valve assembly 14, motors 17, 18, and tank 20 are interconnected in an identical manner to that described above in relation to the first hydraulic pump 11, first control valve assembly 13, and motors 15, 16. Moreover, the operation of the hydraulic circuit which includes the second hydraulic pump 12, second control valve assembly 14, and motors 17, 18 is the same as the operation of the hydraulic circuit which includes the first hydraulic pump 11, first control valve assembly 13, and motors 15, 16. The first and second control valve assemblies 13, 14 are effectively connected in parallel.

The outlets of the first and second pumps 11, 12 are interconnected by a hydraulic balance line 40 to balance the pressure of the hydraulic fluid which is output from the first and second pumps 11, 12 so that the hydraulic fluid is provided at even pressure to the control valve assemblies 13, 14. The hydraulic balance line 40 therefore proportionately distributes the hydraulic fluid between the control valve assemblies 13, 14.

Pumps 11, 12 each have a respective output controller 41. The output controllers 41 of the pumps 11, 12 are linked in parallel so that the pumps 11, 12 have substantially identical outputs.

The hydraulic fluid pressure transducer 19 measures the pressure of the hydraulic fluid which is output to the control valve assemblies 13, 14 by the pumps 11, 12 for diagnostic purposes. The output of the transducer 19 may be connected to a device such as a computer 42 which enables the signal which is output by the transducer 19 to be viewed or recorded.

A pressure shuttle valve 43 is located under the transducer 19 and is connected between the outputs of the pumps 11, 12 in the hydraulic balance line 40. The shuttle valve 43 is able to sense pressure differentials between the outputs of the two pumps 11, 12.

Throughout the specification and the claims, unless the context requires otherwise, the term "comprise", or variations such as "comprises" or "comprising", will be understood to apply the inclusion of the stated integer or group of integers but not the exclusion of any other integer or group of integers.

Throughout the specification and claims, unless the context requires otherwise, the term "substantially" or "about" will be understood to not be limited to the value for the range qualified by the terms.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

It will be clearly understood that, if a prior art publication is referred to herein, that reference does not constitute an admission that the publication forms part of the common general knowledge in the art in Australia or in any other country.

What is claimed is:

1. A drive apparatus for a vehicle, the drive apparatus comprising a hydraulic pump, two control valve assemblies, and two pairs of hydraulic drive assemblies, wherein the control valve assemblies are hydraulically connected in parallel, and in an operational condition hydraulic fluid is pumped through the control valve assemblies by the pump to drive the hydraulic drive assemblies, and wherein each control valve assembly proportionately distributes hydraulic fluid to a respective pair of the hydraulic drive assemblies in response to the hydraulic loads of the respective hydraulic drive assemblies of the respective pairs of hydraulic drive assemblies, and wherein in response to a difference in the respective hydraulic loads of the hydraulic drive assemblies of the respective pairs of hydraulic drive assemblies, flow of hydraulic fluid to the hydraulic drive assembly of each of the respective pairs of hydraulic drive assemblies having the lower hydraulic load is limited, and wherein each of the hydraulic drive assemblies includes a ground engaging drive member and at least one hydraulic motor for driving the drive member, wherein the drive assemblies of the first pair of drive assemblies are located diagonally opposite each other, and wherein the drive assemblies of the second pair of drive assemblies are located diagonally opposite each other, and wherein each of the first pair of drive assemblies is connected in parallel to the first control valve assembly and each of the second pair of drive assemblies is connected in parallel to the second control valve assembly.

2. The drive apparatus of claim 1, wherein the drive apparatus is incorporated into an articulated vehicle.

3. The drive apparatus of claim 1, wherein the hydraulic pump is a variable displacement hydraulic piston pump.

4. The drive apparatus of claim 1, wherein the drive apparatus comprises a plurality of hydraulic pumps.

5. The drive apparatus of claim 4, wherein the hydraulic pumps operate at substantially similar pressures and flow rates.

6. The drive apparatus of claim 4, wherein hydraulic fluid is pumped through each of the control valve assemblies by a respective one of the hydraulic pumps.

7. The drive apparatus of claim 6, wherein the outputs of the hydraulic pumps are connected together by a balance line.

8. The drive apparatus of claim 1, wherein the drive apparatus further comprises a respective charge pump connected to each of the hydraulic pumps.

9. The drive apparatus of claim 8, wherein the drive apparatus further comprises a hydraulic fluid storage tank, and wherein the charge pumps draw low pressure hydraulic fluid from the tank.

10. The drive apparatus of claim 1, wherein the pump includes an output controller.

11. The drive apparatus of claim 1, wherein the motor of each of the hydraulic drive assemblies is a hydraulic piston motor.

12. The drive apparatus of claim 1, wherein the apparatus also comprises a hydraulic fluid pressure transducer for measuring the pressure of the hydraulic fluid which is output to the control valve assemblies.

13. The drive apparatus of claim 1, wherein the apparatus further comprises a pressure shuttle valve connected between the outputs of the hydraulic pumps.

14. The drive apparatus of claim 1, wherein each of the control valve assemblies includes a plurality of proportional displacement flow control valves connected to the pumps, wherein at least one respective proportional displacement flow control valve is connected to each one fo the drive assemblies.

15. The drive apparatus of claim 14, wherein each of the control valve assemblies includes a plurality of anti-cavitation pressure relief valves connected to the pumps, wherein at least one respective anti-cavitation pressure relief valve is connected to each of the proportional displacement flow control valves.

* * * * *